US010317572B2

(12) United States Patent
Liu et al.

(10) Patent No.: US 10,317,572 B2
(45) Date of Patent: Jun. 11, 2019

(54) SYSTEM, METHOD AND COMPUTER PROGRAM PRODUCT FOR DATA PROCESSING FOR ATMOSPHERIC CONDITION

(71) Applicant: International Business Machines Corporation, Armonk, NY (US)

(72) Inventors: Liang Liu, Beijing (CN); Junmei Qu, Beijing (CN); Xiao Guang Rui, Beijing (CN); Lingyun Wang, Beijing (CN); Chao Zhang, Beijing (CN); Wei Zhuang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 299 days.

(21) Appl. No.: 15/274,825

(22) Filed: Sep. 23, 2016

(65) Prior Publication Data

US 2018/0088253 A1    Mar. 29, 2018

(51) Int. Cl.
    *G01W 1/02*    (2006.01)
(52) U.S. Cl.
    CPC ..................... *G01W 1/02* (2013.01)
(58) Field of Classification Search
    CPC .............................. G01N 33/00; G01W 1/02
    See application file for complete search history.

(56) References Cited

U.S. PATENT DOCUMENTS

| 3,619,980 | A | * | 11/1971 | McKay | .................. | B01D 53/60 |
| | | | | | | 95/156 |
| 3,741,480 | A | * | 6/1973 | Van Huisen | ........... | A01G 15/00 |
| | | | | | | 165/45 |
| 6,241,160 | B1 | * | 6/2001 | Redford | ................. | A01G 15/00 |
| | | | | | | 239/14.1 |

(Continued)

FOREIGN PATENT DOCUMENTS

| CN | 101473765 A | 7/2009 |
| CN | 102175216 A | 9/2011 |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Manuel A Rivera Vargas
*Assistant Examiner* — Yaritza H Perez Bermudez
(74) *Attorney, Agent, or Firm* — Grant Johnson, Esq.; McGinn IP Law Group, PLLC

(57) ABSTRACT

A method, system, and computer program product, include determining a first region based on a first point, a second point and a third point associated with temperature indication information that represents association relationship between temperature and pressure, the first and second points being associated with a same temperature value and different pressure values, a temperature inversion ending at the first point, and the temperature inversion starting from (Continued)

the third point, determining, within the first region, a second region associated with the temperature inversion, and predicting atmospheric condition based on the first and second regions.

15 Claims, 7 Drawing Sheets

(56) References Cited

U.S. PATENT DOCUMENTS

| | | | | |
|---|---|---|---|---|
| 7,349,830 | B2* | 3/2008 | Gilbert | G01W 1/00 |
| | | | | 345/633 |
| 9,535,189 | B2* | 1/2017 | Buchanan | G01W 1/02 |
| 2014/0278182 | A1* | 9/2014 | Garcia | G01C 5/06 |
| | | | | 702/95 |
| 2014/0324351 | A1* | 10/2014 | Dannevik | G01W 1/10 |
| | | | | 702/3 |
| 2018/0039718 | A1* | 2/2018 | Bai | G06F 17/5009 |

FOREIGN PATENT DOCUMENTS

| | | |
|---|---|---|
| CN | 204241344 U | 4/2015 |
| WO | WO 2015/175304 A1 | 11/2015 |

OTHER PUBLICATIONS

Peace, Margaret, et al. "The Prediction of Air Pollution Using a Site Optimised Model and Mesoscale Model Wind Forecasts". University of Auckland. Auckland, New Zealand. 2005.

"Guidelines for Developing an Air Quality (Ozone and $PM_{2.5}$) Forecasting Program". U.S. Environmental Protection Agency. Jun. 2003.

* cited by examiner

US 10,317,572 B2

SYSTEM, METHOD AND COMPUTER PROGRAM PRODUCT FOR DATA PROCESSING FOR ATMOSPHERIC CONDITION

BACKGROUND

The present invention relates generally to a data processing for atmospheric condition method, and more particularly, but not by way of limitation, to a system, method, and computer program product for predicting atmospheric conditions.

The atmosphere is a complex natural gaseous system that is essential to support life on planet Earth. However, as the introduction of particulates, biological molecules, or other harmful materials into Earth's atmosphere, air pollution is becoming a worldwide problem. Air pollution is one of the biggest threats to human health, which causes diseases, allergies, death to humans, and also causes damage to other living organisms such as animals and food crops, or the natural or built environment. Good air pollution forecasting method can be used to reduce the damage to human health by preventing people from going out or recommending them wearing masks. There are various methods for predicting atmospheric condition. However, the accuracy and efficiency of these methods are still not satisfactory.

SUMMARY

In an exemplary embodiment, the present invention can provide a computer-implemented method including determining a first region based on a first point, a second point and a third point associated with temperature indication information that represents association relationship between temperature and pressure, the first and second points being associated with a same temperature value and different pressure values, a temperature inversion ending at the first point, and the temperature inversion starting from the third point, determining, within the first region, a second region associated with the temperature inversion, and predicting atmospheric condition based on the first and second regions.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
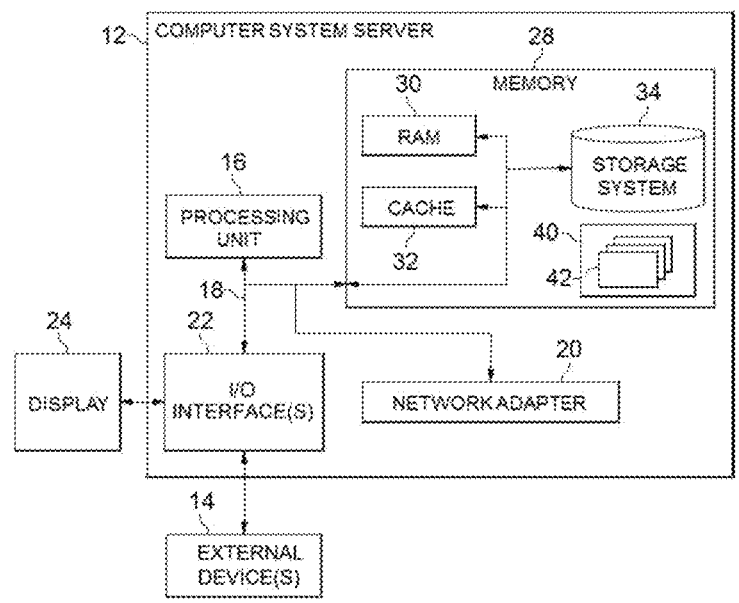
FIG. 1 depicts a cloud computing node 10 according to an embodiment of the present invention.

The invention will now be described with reference to FIG. 1-12, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 5:
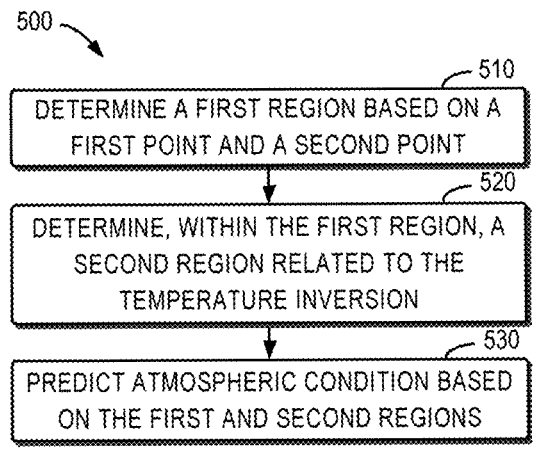
FIG. 5 is a flow chart of a data processing method in accordance with embodiments of the present disclosure.
Figure 6:
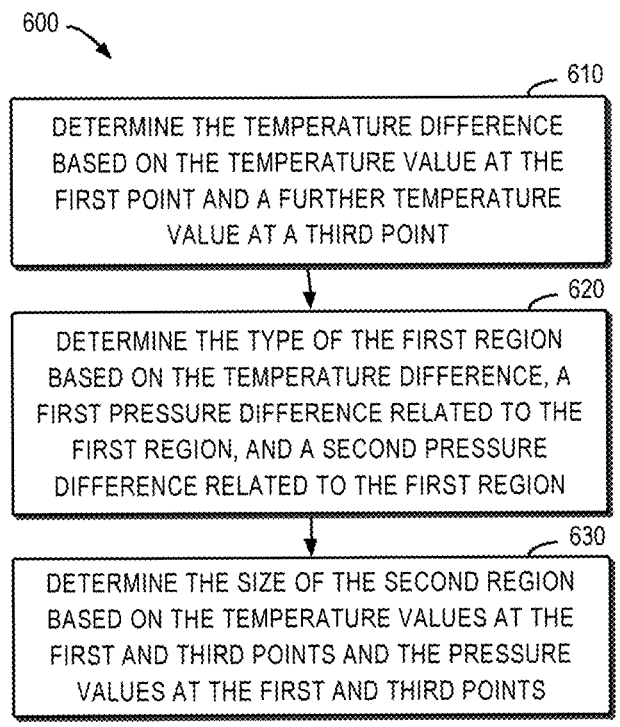
FIG. 6 is a flow chart of a process of predicting atmospheric condition in accordance with embodiments of the present disclosure.

With reference now to the example depicted in FIG. 5, the method 500 includes various steps to determine and predict an atmospheric conditions based on a set of regions. As shown in at least FIG. 1, one or more computers of a computer system 12 according to an embodiment of the present invention can include a memory 28 having instructions stored in a storage system to perform the steps of FIG. 5.

Although one or more embodiments (see e.g., FIGS. 1 and 11-12) may be implemented in a cloud environment 50 (see e.g., FIG. 11), it is nonetheless understood that the present invention can be implemented outside of the cloud environment.

The temperature inversion or the temperature inversion layer can lead to air pollution such as smog being trapped close to the ground, with possible adverse effects on health, and thus the temperature inversion can be used to predict the atmospheric condition. Embodiments of the present disclosure provide a solution for accurately and efficiently predicting the atmospheric condition based on certain factors associated with the temperature inversion.

Figure 2:
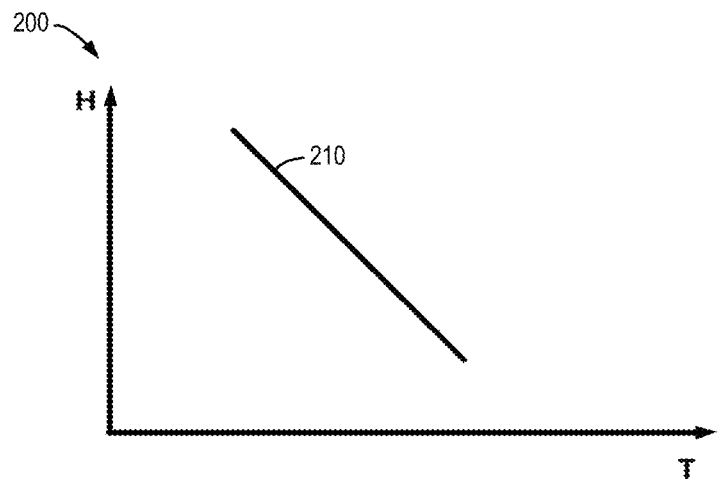
FIG. 2 is a schematic diagram of normal atmospheric condition.

FIG. 2 is a schematic diagram of a sample of normal atmospheric condition 200. In FIG. 2, the normal atmospheric condition 200 is represented in a coordinate system. The horizontal axis of the coordinate system represents temperature, the vertical axis of the coordinate system represents height, and temperature indication information 210 represents association relationship between the temperature and the height in the normal atmospheric condition 200. It is to be understood that in the context of the present disclosure, the term "temperature indication information" includes a temperature indication line, a temperature indication line segment, a temperature indication curve, a temperature indication graph, a temperature indication table, or the like.

As shown in FIG. 2, in the normal atmospheric condition 200, the temperature decreases as the height increases. Usually, within the lower atmosphere, the air near the surface of the Earth is warmer than the air above it, largely because the atmosphere is heated from below as solar radiation warms the Earth's surface, which in turn then warms the layer of the atmosphere directly above it, e.g., by convective heat transfer.

Figure 3:
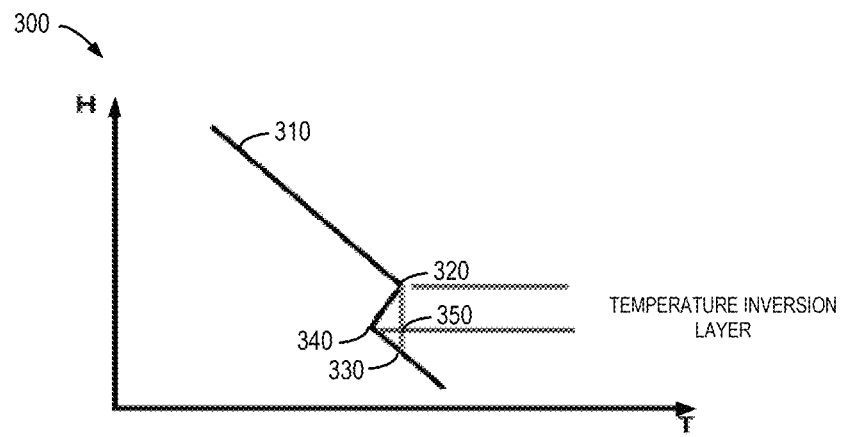
FIG. 3 is a schematic diagram of atmospheric condition with temperature inversion.

As compared with the normal atmospheric condition 200, FIG. 3 shows a sample of atmospheric condition 300 with temperature inversion. As with FIG. 2, the atmospheric condition 300 is represented in a coordinate system in FIG. 3. The horizontal axis of the coordinate system represents temperature, the vertical axis of the coordinate system represents height, and temperature indication information 310 represents association relationship between the temperature and the height in the atmospheric condition 300.

As shown in FIG. 3, in the atmospheric condition 300, the temperature increases as the height increases when the temperature inversion occurs. The temperature inversion starts at a point 340 associated with the temperature indication information 310, and ends at another point 320 associated with the temperature indication information 310, because the temperature starts increasing as the height increasing at the point 340, and ends increasing as the height increasing at the point 320. A point 330 associated with the temperature indication information 310 is of a same temperature value with the point 320, and of different height values with the point 320. A point 350 is of a same temperature value with the point 320, and of a same height value of the point 340. The atmosphere between the height of the points 320 and 340 is referred to as the temperature inversion layer within which the temperature inversion occurs.

Figure 4:
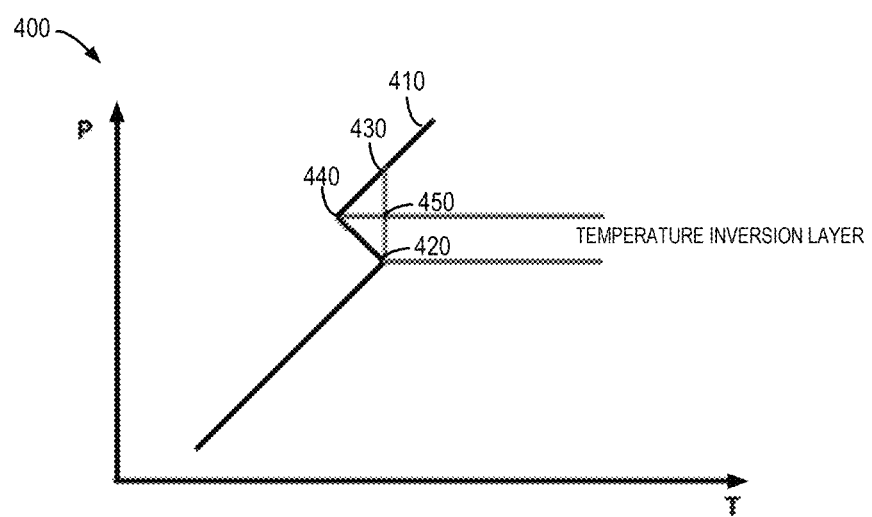
FIG. 4 is a schematic diagram of another atmospheric condition with temperature inversion.

In practice, obtaining the accurate height value is a difficult task, and thus pressure is used in place of height. FIG. 4 is a schematic diagram of a sample of another atmospheric condition 400 with temperature inversion. Different from FIG. 3, the vertical axis of the coordinate system represents pressure in FIG. 4. As shown in FIG. 4, in the atmospheric condition 400, the temperature decreases as the pressure increases when the temperature inversion occurs. The temperature inversion starts at a point 440 associated with the temperature indication information 410, and ends at another point 420 associated with the temperature indication information 410, because the temperature starts decreasing as the pressure increasing at the point 440, and ends decreasing as the pressure increasing at the point 420. A point 430 associated with the temperature indication information 410 is of a same temperature value with the point 420, and of different pressure values with the point 420. A point 450 is of a same temperature value with the point 420, and of a same pressure value with the point 440. The atmosphere between the pressure of the points 420 and 440 is referred to as the temperature inversion layer within which the temperature inversion occurs.

Well-designed atmospheric condition predicting approaches can be used to reduce the adverse effects on health. Although conventional approaches take the temperature inversion into consideration in predicting the atmospheric condition, the factors such as temperature difference, type and size of a certain region associated with the temperature inversion are not taken into consideration. Thus the conventional approaches are inaccurate and inefficient. As a result, the present disclosure which takes these factors into consideration can be more accurately and efficiently in the atmospheric condition prediction.

FIG. 5 is a flow chart of a data processing method 500 in accordance with embodiments of the present disclosure. The method 500 may be implemented in the computer system/server 12 as shown in FIG. 1.

At 510, a first region associated with the temperature inversion may be determined based on a first point, a second point and a third point associated with temperature indication information. The temperature indication information may represent association relationship between temperature and pressure. The first and second points may be associated with a same temperature value and different pressure values. A temperature inversion may end at the first point. The temperature inversion may start from the third point.

Now an example of 510 will be described with reference to FIG. 4. The first region may be determined based on the points 420, 430 and 440. As described above, the point 430 is of the same temperature value with the point 420, and of different pressure values with the point 420, the temperature inversion ends at the point 420, and the temperature inversion may start from the point 440. In some embodiments, the first region may be a region enclosed by the temperature indication information 410 and a line formed by the points 420 and 430.

Still in reference to FIG. 5, at 520, a second region associated with the temperature inversion may be determined within the first region. In some embodiments, the second region may be a region associated with the temperature inversion. For example, the second region may be a part of the first region overlapped with the temperature inversion layer. As an example, referring back to FIG. 4, the second region may be determined based on the points 420, 440 and 450. As described above, the point 450 is of the same temperature value with the point 420, and of the same pressure value with the point 440, and thus the second region is determined within the first region.

At 530, atmospheric condition may be predicted based on the first and second regions determined at 510 and 520. In some embodiments, the atmospheric condition may be predicted based on at least one of a temperature difference associated with the temperature inversion, a type of the first region, and a size of the second region. Example embodiments of the action 530 will be described below with reference to FIG. 6 which shows a flow chart of the process 600 of predicting the atmospheric condition in accordance with embodiments of the present disclosure.

Figure 7:
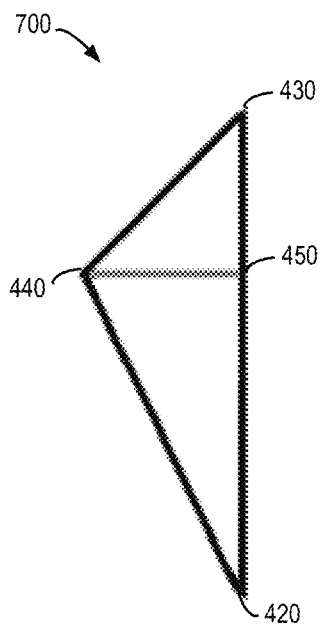
FIG. 7 is a schematic diagram of a graph associated with predicting atmospheric condition in accordance with embodiments of the present disclosure.

At 610, the temperature difference associated with the temperature inversion may be determined based on the temperature value at the first point and a further temperature value at a third point associated with the temperature indication information. The temperature inversion may start from the third point. As an example, FIG. 7 is a schematic diagram of a graph 700 associated with predicting atmospheric condition in accordance with embodiments of the present disclosure. Graph 700 may represent the first region determined at 510.

In FIG. 7, the temperature difference may be determined based on the temperature value at the point 420 and a further temperature value at the point 440. In some embodiments, the temperature difference may be determined based on length of a line formed by the points 420 and 440. For example, the temperature difference may be determined by multiplying the length of the line formed by the points 420 and 440 by slope of that line. Assuming that the coordinate of the point 440 is ($x_1$, $y_1$) and the coordinate of the point 420 is ($x_2$, $y_2$), the temperature difference may be determined as below:

$$TD = \sum_{i=1}^{N-1} k_i e_i = \sum \frac{y_{i+1} - y_i}{x_{i+1} - x_i} \sqrt{(y_{i+1} - y_i)^2 + (x_{i+1} - x_i)^2} \quad (1)$$

where TD represents the temperature difference, k represents the slope, e represents the length, and N represents the number of the points that are taken into consideration. In this case, N=2.

Referring back to FIG. 6, at 620, the type of the first region may be determined based on the temperature difference determined at 610, a first pressure difference associated with the first region, and a second pressure difference associated with the first region. The first pressure difference may be different from the second pressure difference. In some embodiments, the first pressure difference may be determined based on the pressure values at the first and second points. The second pressure difference may be determined based on the pressure values at the first and third points.

In the example shown in FIG. 7, the first pressure difference may be determined based on the pressure values at the points 420 and 430. In some embodiments, the first pressure difference may be the difference between the pressure values at the points 420 and 430. The second pressure difference may be determined based on the pressure values at the points 420 and 450. In some embodiments, the second pressure difference may be the difference between the pressure values at the points 420 and 450.

In some embodiments, the type of the first region may be determined as below:

$$\text{type} = \begin{cases} \text{first type, if } \frac{a}{b} \geq \alpha \text{ and } \frac{c}{d} \geq \beta \\ \text{second type, if } \frac{a}{b} \geq \alpha \text{ and } \frac{c}{d} < \beta \\ \text{third type, if } \frac{a}{b} < \alpha \text{ and } \frac{c}{d} \geq \beta \\ \text{fourth type, if } \frac{a}{b} < \alpha \text{ and } \frac{c}{d} \geq \beta \end{cases} \quad (2)$$

where α represents the length of a line formed by the points 420 and 430 (that is, the first pressure difference), b represents the length of a line formed by the points 440 and 450 (that is, the temperature difference), c represents a half of the first pressure difference, d represent the length of a line formed by the points 420 and 450 (that is, the second pressure difference), and α and β are factors predetermined or learned from the temperature indication information, such as α can be set to 3.2, and such as β can be set to 0.7.

The first type of the first region (T1) indicates that the temperature inversion layer is of low intensity and small thickness. That is, the temperature difference associated with the temperature inversion is small, and the pressure difference associated with the temperature inversion is also small. The second type of the first region (T2) indicates that the temperature inversion layer is of low intensity and large thickness. That is, the temperature difference associated with the temperature inversion is small, and the pressure difference associated with the temperature inversion is large. The third type of the first region (T3) indicates that the temperature inversion layer is of high intensity and large thickness. That is, the temperature difference associated with the temperature inversion is large, and the pressure difference associated with the temperature inversion is also large. The fourth type of the first region (T4) indicates that the temperature inversion layer is of high intensity and small thickness. That is, the temperature difference associated with the temperature inversion is large, and the pressure difference associated with the temperature inversion is small.

At 630, the size of the second region may be determined based on the temperature values at the first and third points and the pressure values at the first and third points. Again, an example embodiment will now be described with reference to FIG. 7. It is stilled assumed that the coordinate of the point 440 is ($x_1$, $y_1$), the coordinate of the point 420 is ($x_2$, $y_2$), and the coordinate of the point 450 is ($x_3$, $y_3$). The size of the second region may be determined as below:

$$S = \frac{1}{2} \sum_{j=1}^{N-1} (x_j y_{j+1} - x_{j+1} y_j) \quad (3)$$

where N represents the number of the points that are taken into consideration. In this case, N=3.

Through the above discussions, it would be appreciated that the embodiments of the present disclosure utilizes the factors of temperature difference, the type of the first region, and the size of the second region associated with the temperature inversion to predict the atmospheric condition, such that the prediction can be more accurately and efficiently.

Figure 8:
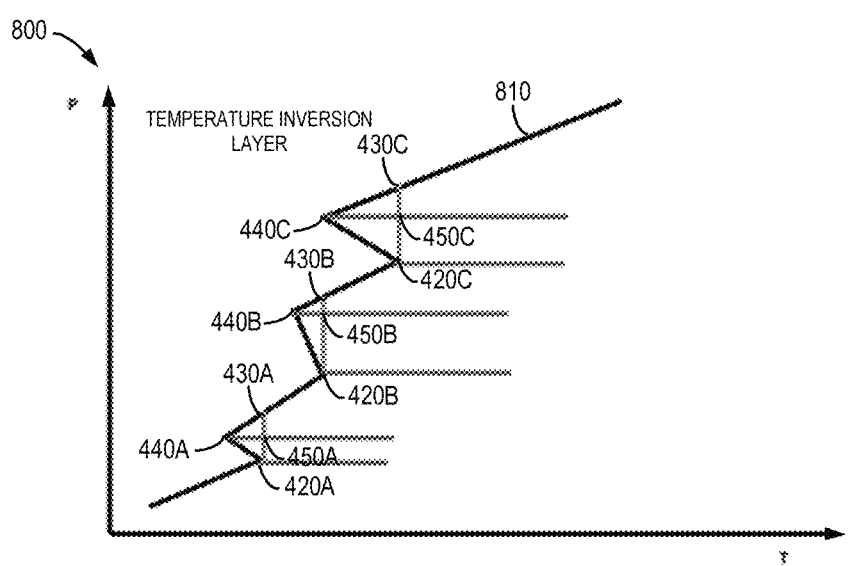
FIG. 8 is a schematic diagram of temperature indication information of atmospheric condition with a plurality of temperature inversions.

The data processing method associated with a single temperature inversion is described above. However, as shown in FIG. 8, more than one temperature inversion layers exists in the atmosphere in general. The temperature inversion layers can be found by traversing the temperature indication information 810 from bottom to top. In response to finding a plurality of temperature inversion layers, the plurality of temperature inversion layers can be combined to predict the atmospheric condition. As in the case of a single temperature inversion layer, the first and second regions associated with the plurality of temperature inversions may be determined In FIG. 8, three first regions may be determined based on the points 420A and 430A, the points 420B and 430B, and the points 420C and 430C, respectively. Additionally, three second regions may be determined based on the points 420A, 440A and 450A, the points 420B, 440B and 450B, and the points 420C, 440C and 450C, respectively. In some embodiments, the three first regions can be combined and reshaped to form a first combined region (which is also a first region), and the three second regions can be combined to form a second combined region (which is also a second region).

Figure 9:
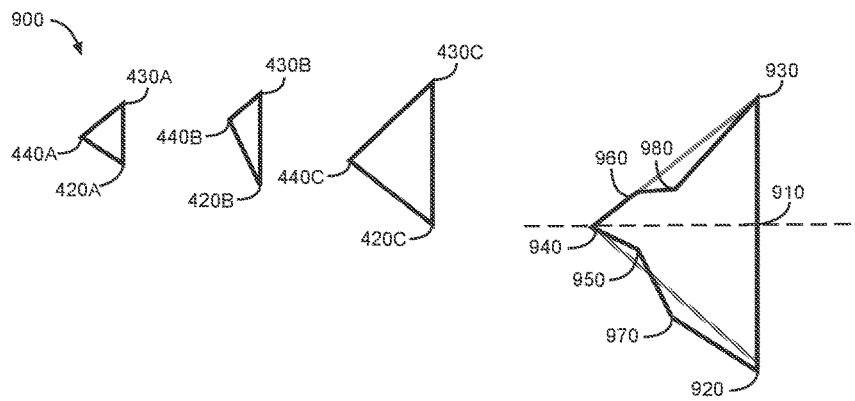
FIG. 9 is a schematic diagram of the process of combining a plurality of regions into one region in accordance with embodiments of the present disclosure.

FIG. 9 shows how to combine the plurality of the first and second regions into the first and second combined regions. As shown, the respective sides of the three first regions are connected. For example, the point 440A is formed as a point 940 of the first combined region, the points 420A and 440B are connected and formed as a point 950, the points 420B and 440C are connected and formed as a point 970, the points 430A and 440B are connected and formed as a point 960, the points 430B and 440C are connected and formed as a point 980, the point 420C is formed as a point 920, and the point 330C is formed as a point 930. Additionally, a point 910 is of a same pressure value with the point 940 and of a same temperature value with the point 920.

The points 920, 930 and 940 are selected as the vertexes of the first combined region, such that the combined temperature difference associated with the first combined region is accumulated by the temperature differences associated with the three first regions, and the combined pressure difference associated with the first combined region is accumulated by the pressure differences associated with the three first regions. Additionally, the second combined region is determined based on the points 910, 920, 940, 950 and 970 associated with the plurality of the temperature inversions.

In some embodiments, the atmospheric condition may be predicted based on at least one of the combined temperature difference associated with the plurality of temperature inversions, the type of the first combined region, and the size of the second combined region.

The combined temperature difference associated with the plurality of temperature inversions can be determined by adding these temperatures differences together. Assuming that the coordinate of the point 940 is $(u_1, v_1)$, the coordinate of the point 950 is $(u_2, v_2)$, the coordinate of the point 970 is $(u_3, v_3)$, and the coordinate of the point 920 is $(u_4, v_4)$. The combined temperature difference may also be determined by Equation (1) as discussed above.

The type of the first combined region may be determined by Equation (2). In this case, a represents the length of a line formed by points 920 and 930 (that is, the combined first pressure difference accumulated by the first pressure differences associated with the plurality of the first regions), b represents the length of a line formed by points 910 and 920 (that is, the combined temperature difference), c represents a half of the combined first pressure difference, and d represent the length of a line formed by points 910 and 940 (that is, the combined second pressure difference accumulated by the second pressure differences associated with the plurality of the first regions).

Additionally, the type of the first combined region also indicates the intensity and thickness of the temperature inversion layers. It is stilled assumed that the coordinate of the point 940 is $(u_1, v_1)$, the coordinate of the point 950 is $(u_2, v_2)$, the coordinate of the point 970 is $(u_3, v_3)$, the coordinate of the point 920 is $(u_4, v_4)$, and the coordinate of the point 910 is $(u_5, v_5)$. The size of the second combined region may also be determined by Equation (3).

The size of the second region and the temperature difference may be compared with a predetermined threshold for the size and a predetermined threshold for the temperature difference, respectively. If the size of the second region is higher than the predetermined threshold for the size, and/or the temperature difference is higher than the predetermined threshold for the temperature difference, the respective temperature difference, the respective type of the first region, and the respective size of the second region can be listed in Table 1, for further processing to predict the atmospheric condition. The further processing method may be for example the linear regression. In Table 1, T1 through T4 each represents a respective type of the first region, S1 through S4 each represents a respective size value of the second region, and TD1 through TD4 each represents a respective temperature difference.

TABLE 1

| TYPE | SIZE | TEMPERATURE DIFFERENCE |
| --- | --- | --- |
| T1 | S1 | TD1 |
| T2 | S2 | TD2 |
| T3 | S3 | TD3 |
| T4 | S4 | TD4 |

Figure 10:
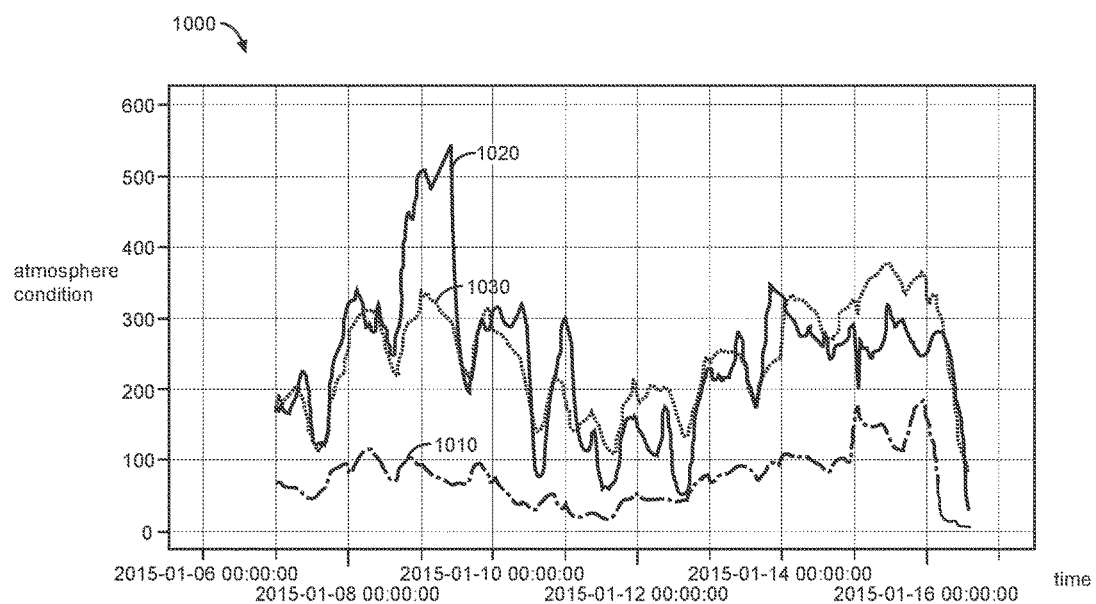
FIG. 10 is a schematic diagram of the comparison between the conventional predicting result and the predicting result in accordance with embodiments of the present disclosure.

The predicting result 1030 determined based on at least one of the temperature difference, the type of the first region, and the size of the second region determined according to the present disclosure, the predicting result 1010 determined based on the conventional method, and the real atmospheric condition 1020 are shown in FIG. 10. As shown in FIG. 10, as compared with the predicting result 1010, the predicting result 1030 is more accurate.

With the solution of the present disclosure, the atmospheric condition can be predicted more accurately and efficiently, and thus greatly reduce the damage caused to damage to human and other living organisms such as animals and food crops, or the natural or built environment.

Exemplary Aspects, Using a Cloud-computing Environment

Although this detailed description includes an exemplary embodiment of the present invention in a cloud-computing environment, it is to be understood that implementation of the teachings recited herein are not limited to such a cloud-computing environment. Rather, embodiments of the present invention are capable of being implemented in conjunction with any other type of computing environment now known or later developed.

Cloud-computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud-computing is an infrastructure comprising a network of interconnected nodes.

Referring now to FIG. 1, a schematic of an example of a cloud-computing node is shown. Cloud-computing node 10 is only one example of a suitable node and is not intended to suggest any limitation as to the scope of use or functionality of embodiments of the invention described herein. Regardless, cloud-computing node 10 is capable of being implemented and/or performing any of the functionality set forth herein.

Although cloud-computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud-computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud-computing environments where tasks are performed by remote processing circuits that are linked through a communications network. In a distributed cloud-computing environment, program modules may be located in both local and remote computer system storage media including memory storage circuits.

Referring again to FIG. 1, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 11:
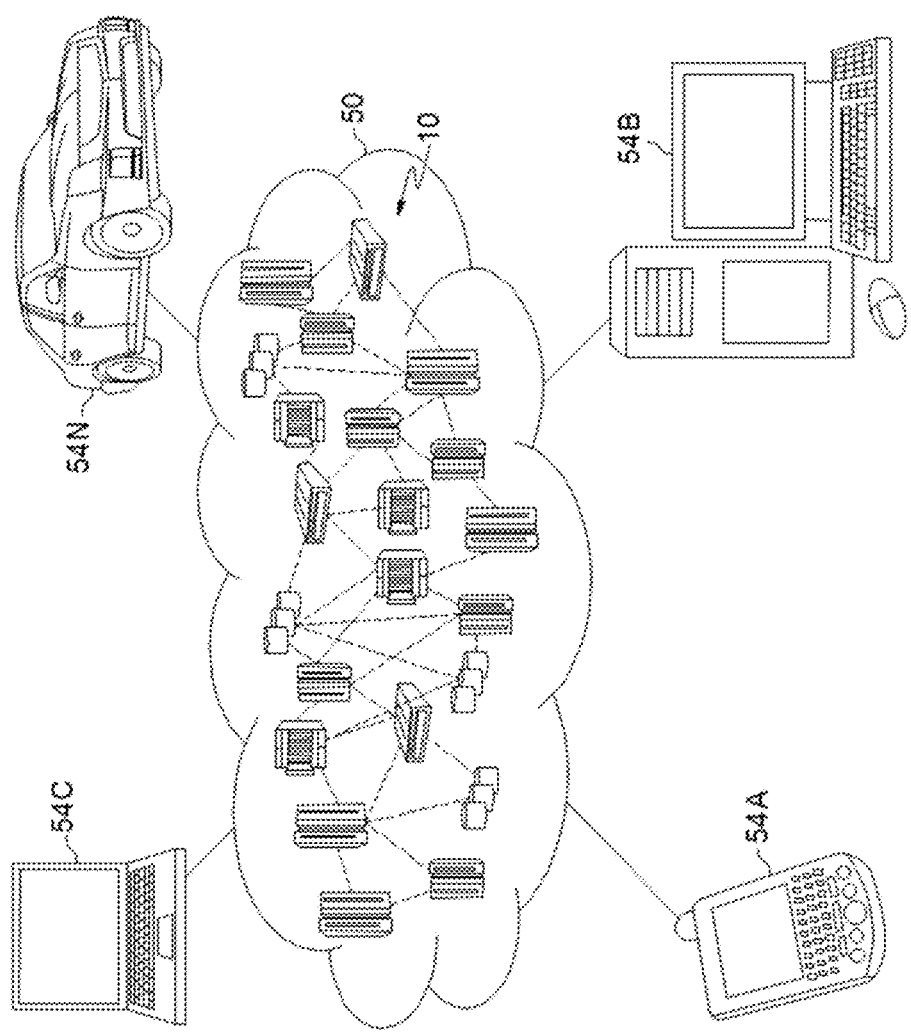
FIG. 11 depicts a cloud computing environment 50 according to an embodiment of the present invention.

Referring now to FIG. 11, illustrative cloud-computing environment 50 is depicted. As shown, cloud-computing environment 50 comprises one or more cloud-computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing circuit. It is understood that the types of computing circuits 54A-N shown in FIG. 11 are intended to be illustrative only and that computing nodes 10 and cloud-computing environment 50 can communicate with any type of computerized circuit over any type of network and/or network addressable connection (e.g., using a web browser).

Figure 12:
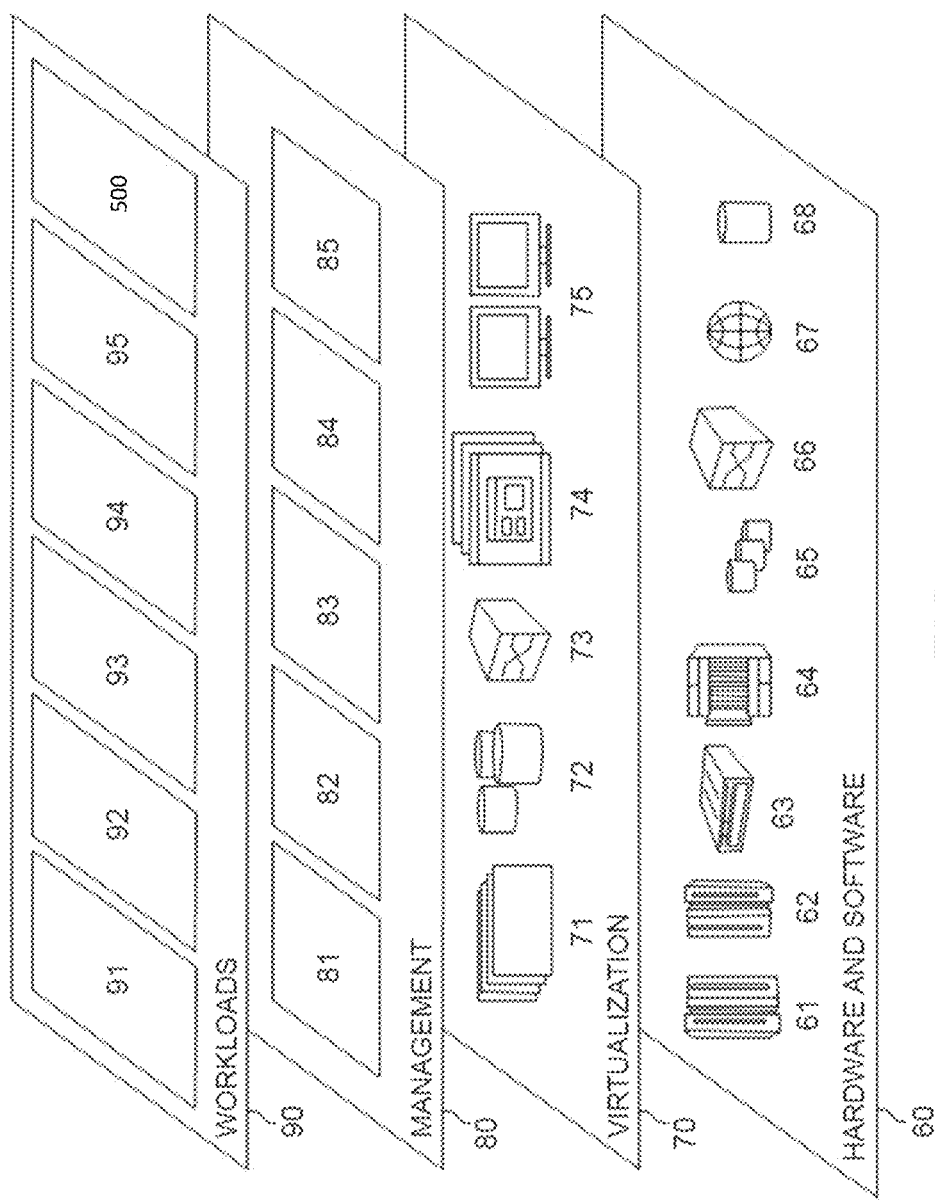
FIG. 12 depicts abstraction model layers according to an embodiment of the present invention.

Referring now to FIG. 12, an exemplary set of functional abstraction layers provided by cloud-computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud-computing resource allocation and management such that required service levels are met. Service Level Agreement (SLA) planning and fulfillment 85 provide pre-arrangement for, and procurement of, cloud-computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the method 500.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method comprising:
   determining a first region based on a first point, a second point and a third point associated with temperature indication information that represents an association relationship between temperature and pressure, the first and second points being associated with a same temperature value and different pressure values, a temperature inversion ending at the first point, and the temperature inversion starting from the third point;
   determining, within the first region, a second region associated with the temperature inversion;
   predicting an atmospheric condition based on the first and second regions;
   predicting the atmospheric condition further based on at least one of a temperature difference associated with the temperature inversion, a type of the first region, and a size of the second region;
   determining the size of the second region based on the temperature values at the first and third points and the pressure values at the first and third points;

obtaining a first combined region combining a first plurality of regions;

obtaining a second combined region by combining a second plurality of regions; and predicting the atmospheric condition based on the first and second combined regions.

2. The computer-implemented method of claim 1, further comprising:

determining the temperature difference based on the temperature value at the first point and a further temperature value at the third point.

3. The computer-implemented method of claim 2, further comprising:

determining the type of the first region based on the temperature difference, a first pressure difference associated with the first region, and a second pressure difference associated with the first region, the first pressure difference being different from the second pressure difference;

determining the first pressure difference based on the pressure values at the first and second points; and determining the second pressure difference based on the pressure values at the first and third points.

4. The computer-implemented method of claim 1, embodied in a cloud-computing environment.

5. The computer-implemented method of clam 1, wherein the temperature difference is determined based on a length of a line formed by the first point and the third point.

6. The computer-implemented method of claim 1, wherein the temperature difference is determined by multiplying a length of a line formed by the first point and the third point by a slope of the line.

7. The computer-implemented method of claim 5, wherein, assuming that a coordinate of the third point is (x1, y1) and a coordinate of the first point is (x2, y2), the temperature difference is determined based on $$TD = \sum_{i=1}^{N-1} k_i e_i = \sum \frac{y_{i+1} - y_i}{x_{i+1} - x_i} \sqrt{(y_{i+1} - y_i)^2 + (x_{i+1} - x_i)^2},$$

where TD represents the temperature difference, k represents a slope, e represents the length of the line, and N represents a number of the points that are taken into consideration.

8. The computer-implemented method of claim 6, wherein, assuming that a coordinate of the third point is (x1, y1) and a coordinate of the first point is (x2, y2), the temperature difference is determined based on $$TD = \sum_{i=1}^{N-1} k_i e_i = \sum \frac{y_{i+1} - y_i}{x_{i+1} - x_i} \sqrt{(y_{i+1} - y_i)^2 + (x_{i+1} - x_i)^2},$$

where TD represents the temperature difference, k represents the slope, e represents the length of the line, and N represents a number of the points that are taken into consideration.

9. A system comprising:
a processor; and
a memory, the memory storing instructions to cause the processor to perform:
determining a first region based on a first point, a second point and a third pointe associated with temperature indication information that represents an association relationship between temperature and pressure, the first and second points being associated with a same temperature value and different pressure values, a temperature inversion ending at the first point, and the temperature inversion starting from the third point;

determining, within the first region, a second region associated with the temperature inversion;

predicting an atmospheric condition based on the first and second regions;

predicting the atmospheric condition further based on at least one of a temperature difference associated with the temperature inversion, a type of the first region, and a size of the second region;

determining the size of the second region based on the temperature values at the first and third points and the pressure values at the first and third points;

obtaining a first combined region by combining a first plurality of regions;

obtaining a second combined region by combining a second plurality of regions; and predicting the atmospheric condition based on the first and second combined regions.

10. The system of claim 9, wherein the memory further stores instructions to cause the processor to perform:
determining the temperature difference based on the temperature value at the first point and a further temperature value at the third point.

11. The system of claim 10, wherein the memory further stores instructions to cause the processor to perform:
determining the type of the first region based on the temperature difference, a first pressure difference associated with the first region, and a second pressure difference associated with the first region, the first pressure difference being different from the second pressure difference;

determining the first pressure difference based on the pressure values at the first and second points; and determining the second pressure difference based on the pressure values at the first and third points.

12. The system of claim 9, embodied in a cloud-computing environment.

13. A computer program product, the computer program product comprising a non-transitory computer-readable storage medium having program instructions embodied therewith, the program instructions being executable by a computer to cause the computer to:

determine a first region based on a first point, a second point and a third point associated with temperature indication information that represents an association relationship between temperature and pressure, the first and second points being associated with a same temperature value and different pressure values, a temperature inversion ending at the first point, and the temperature inversion starting from the third point;

determine, within the first region, a second region associated with the temperature inversion;

predict an atmospheric condition based on the first and second regions;

predict the atmospheric condition further based on at least one of a temperature difference associated with the temperature inversion, a type of the first region, and a size of the second region;

determine the size of the second region based on the temperature values at the first and third points and the pressure values at the first and third points;

obtain a first combined region by combining a first plurality of regions;

obtain a second combined region combining a second plurality of regions; and predict the atmospheric condition based on the first and second combined regions.

14. The computer program product of claim 13, wherein the instructions, when executed on the computer, cause the computer to:

determine the temperature difference based on the temperature value at the first point and a further temperature value at the third point.

15. The computer program product of claim 14, wherein the instructions, when executed on the computer, cause the computer to:

determine the type of the first region based on the temperature difference, a first pressure difference associated with the first region, and a second pressure difference associated with the first region, the first pressure difference being different from the second pressure difference;

determine the first pressure difference based on the pressure values at the first and second points; and determine the second pressure difference based on the pressure values at the first and third points.

* * * * *